US007715795B2

(12) United States Patent
Pirzada et al.

(10) Patent No.: US 7,715,795 B2
(45) Date of Patent: May 11, 2010

(54) SYSTEMS AND METHODS FOR MANAGING OUT-OF-BAND DEVICE CONNECTION

(75) Inventors: Fahd B. Pirzada, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 12/150,890

(22) Filed: May 1, 2008

(65) Prior Publication Data

US 2008/0248751 A1 Oct. 9, 2008

Related U.S. Application Data

(63) Continuation of application No. 11/078,153, filed on Mar. 11, 2005, now Pat. No. 7,386,275.

(51) Int. Cl.
*H04B 7/00* (2006.01)
(52) U.S. Cl. .................... 455/41.2; 455/410; 455/411; 455/552.1; 340/3.51; 340/5.8; 340/5.86
(58) Field of Classification Search ............ 455/39, 455/41.2, 410, 411, 552.1; 340/568.1, 426.1, 340/539.1, 572.1, 586, 3.51, 5.8, 5.86, 10.1, 340/10.3
See application file for complete search history.

(56) References Cited

U.S. PATENT DOCUMENTS

| 5,629,981 | A | 5/1997 | Nerlikar |
|---|---|---|---|
| 5,930,368 | A | 7/1999 | Hocker et al. |
| 5,949,335 | A | 9/1999 | Maynard |
| 6,046,676 | A | 4/2000 | Ward et al. |
| 6,067,076 | A | 5/2000 | Hocker et al. |
| 6,072,468 | A | 6/2000 | Hocker et al. |
| 6,177,860 | B1 | 1/2001 | Cromer et al. |
| 6,294,997 | B1 | 9/2001 | Paratore et al. |
| 6,379,058 | B1 | 4/2002 | Petteruti et al. |
| 6,525,648 | B1 | 2/2003 | Kubler et al. |
| 6,724,309 | B2 | 4/2004 | Grose et al. |
| 6,748,544 | B1 | 6/2004 | Challener et al. |
| 6,778,096 | B1 | 8/2004 | Ward et al. |
| 6,828,902 | B2 | 12/2004 | Casden |
| 6,978,118 | B2 | 12/2005 | Vesikivi et al. |
| 7,202,783 | B2 | 4/2007 | Want et al. |
| 2002/0047777 | A1 | 4/2002 | Casden |
| 2002/0062251 | A1 | 5/2002 | Anandan et al. |
| 2003/0114104 | A1* | 6/2003 | Want et al. ............... 455/39 |

(Continued)

FOREIGN PATENT DOCUMENTS

EP    1335563  A2    8/2003

(Continued)

OTHER PUBLICATIONS

Search Report, GB0604884.7, Jun. 2006, 1 pg.

(Continued)

*Primary Examiner*—Tuan A Pham
(74) *Attorney, Agent, or Firm*—O'Keefe, Egan, Peterman & Enders LLP

(57) ABSTRACT

Systems and methods for managing connection of devices to a wireless network using out-of-band communications.

20 Claims, 4 Drawing Sheets

U.S. PATENT DOCUMENTS

| | | |
|---|---|---|
| 2004/0166807 A1 | 8/2004 | Vesikivi et al. |
| 2004/0176032 A1* | 9/2004 | Kotola et al. ................ 455/41.2 |
| 2004/0235504 A1 | 11/2004 | Kohno et al. |
| 2004/0248514 A1* | 12/2004 | Idani et al. ................. 455/41.2 |
| 2004/0268132 A1 | 12/2004 | Waris |
| 2005/0013103 A1 | 1/2005 | Chandley |
| 2005/0108369 A1 | 5/2005 | Sather |
| 2006/0172722 A1 | 8/2006 | Christensen et al. |
| 2006/0181395 A1 | 8/2006 | Gruszynski |
| 2006/0205354 A1 | 9/2006 | Pirzada et al. |
| 2007/0143456 A1 | 6/2007 | Mashinsky |

FOREIGN PATENT DOCUMENTS

| | | |
|---|---|---|
| EP | 1335563 A3 | 10/2003 |
| GB | 2408128 A | 5/2005 |
| TW | 393630 | 6/2000 |
| TW | 565802 | 12/2003 |
| WO | WO02/082363 A1 | 10/2002 |
| WO | WO2004/100503 A2 | 11/2004 |
| WO | WO2004/100503 A3 | 11/2004 |
| WO | WO2005/088932 A1 | 9/2005 |
| WO | WO2005/119964 A1 | 12/2005 |
| WO | WO2006/039119 A1 | 4/2006 |

OTHER PUBLICATIONS

Search Report, SG200601400-5; Jul. 26, 2006; 5 pgs.
Search Report, TW095107563; Jul. 21, 2007; 2 pgs.

* cited by examiner

SYSTEMS AND METHODS FOR MANAGING OUT-OF-BAND DEVICE CONNECTION

This patent application is a continuation of U.S. patent application Ser. No. 11/078,153 entitled "Systems and Methods for Managing Out-of-Band Device Connection", filed Mar. 11, 2005, now U.S. Pat. No. 7,386,275, which is incorporated herein by reference in its entirety.

BACKGROUND OF THE INVENTION

1. Field of the Invention

This invention relates generally to wireless networks, and more particularly to device connection management in wireless networking environments.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In electronic networking environments, a challenging and persistent problem for end-users is managing the connection of peripherals and devices to the network. For wireless networks, one of the key challenges is association and connectivity of known and trusted peripheral devices and other networked information handling systems into a secure network model. The proliferation of wireless technologies such as wireless wide area networks (WWANs), wireless local area networks (WLANs) and wireless personal area networks (WPANs) that enable peripheral devices into a network (be it local, ad-hoc or infrastructure) drives complexity in terms of ease-of-use, configuration, management and security. Current wireless networking technology employs individual wireless device profiles (e.g., Windows zero config, and other proprietary software configuration utilities) and WLAN authentication and security mechanisms (e.g., 802.11i).

Radio frequency identification (RFID) technology is currently employed in applications that vary from inventory management and traffic telematics (e.g., traffic toll tags) to security ID badges and pet tags, and supply chain management systems.

SUMMARY OF THE INVENTION

Disclosed herein are systems and methods for managing connection of information handling systems as network devices to a wireless network using out-of-band communications, such as radio frequency identification (RFID) communications or other suitable communication medium. Using the disclosed systems and methods, out-of-band communications may be advantageously employed to manage (e.g., create, activate, etc.) and exchange wireless device profile information for network devices. Using out-of-band wireless device profile management, the disclosed systems and methods may be implemented to provide a variety of out-of-band device management capabilities including, but not limited to, out-of-band device status management and proximity based authentication and security for wireless networks. For example, in one exemplary embodiment the disclosed systems and methods may be employed to define a set of known and trusted peripherals and networked devices in a wireless LAN (WLAN) environment, such as a home, small office/home office (SOHO), or small-medium business (SMB) environment.

The disclosed systems and methods may be implemented in one embodiment to provide a dual layer security for a wireless networking environment. For example, a wireless network may be configured with one security layer that includes a proximity-based out-of-band identification communication mechanism in combination with another security layer that includes a traditional in-band wireless security mechanism, e.g., traditional Wi-Fi Protected Access (WPA) mechanism, Wired Equivalent Privacy (WEP) mechanism, 802.11i based security mechanism, etc. In one exemplary embodiment, MAC addresses may be used as unique device identification information (identifier or identification tag), and out-of-band identification communication used as a vehicle for the secure delivery this identification information coupled with the associated mechanism for integration into wireless LANs/PANs.

In one embodiment of the disclosed systems and methods, proximity-based out-of-band identification communications may be provided, for example, using short range radio frequency (RF) transmissions or other suitable short range transmission media. For example, a proximity-based out-of-band identification communication mechanism may be implemented in one embodiment using RFID tag and reader modules that have relatively low power and data rate. Such a proximity-based out-of-band identification communication methodology may be implemented to address spoofing concerns by employing out-of-band transmission devices (e.g., RFID tags) that do not transmit unless they are in the proximity of a complementary out-of-band receiver device (e.g., RFID reader). Security may be further enhanced by not storing vital information (e.g., SSID and security keys) on the out-of-band communication equipment.

In one exemplary embodiment, RFID modules be integrated in information handling system platforms ranging from notebook computers and PDAs to WLAN Access Points and printers. In this regard, RFID modules may be employed across a wide variety of information handling platform sizes and types due to their relatively low cost and relatively small size. Furthermore, RFID systems may be employed to provide wireless device profile management (creation, activation etc.), unique proximity based authentication and security mechanisms for WLANs, and/or to provide the ability to perform out-of-band device status management.

One or more features may be implemented, alone or in combination, using the disclosed systems and methods as needed or desired to fit the characteristics of a given application. These features include, but are not limited to, use of out-of-band (e.g., RFID) labels that are passive and that may be actively scanned, use of individual RFID enabled devices that are each unique and identifiable, use of out-of-band (e.g., RFID) communication to provide trusted (known) device ID association, and asset tracking of network devices (in/out of network). Additional features include, but are not limited to, implementation of wireless device status management capability using out-of-band (e.g., RFID) communications. Examples of such out-of-band device status management capabilities include, but are not limited to, device configuration management (e.g., management of unique attributes and parameters of a device, such as revision control, Interrupt types/level, etc.), device profile configuration management (e.g., creation and management of usage-profiles by pairing or grouping various secondary wireless devices; activation/deactivation of certain usage profiles; implementing one or more policies for adding/deleting devices to profiles, etc.), authentication and association of secondary wireless devices, combinations of such capabilities as well as any other form of management capability relative to the status of one or more devices within a wireless networking environment.

In the practice of various embodiments of the disclosed methods and systems, unique device ID parameters and features may be employed, and/or support may be provided for legacy hardware without out-of-band (e.g., RFID) technology (e.g., including the ability to create and manage special profiles for devices that do not support mechanisms for out-of-band communications; addition of legacy hardware to regular usage profiles; the activation of legacy hardware linked to the activation of another out-of-band enabled device in the same profile, etc.). Furthermore, "True" central configuration may be provided for varied wireless devices supporting 802.11a/b/g/n, Bluetooth, UWB, Cellular, Zigbee, WiMAX etc. (e.g., the ability to maintain authentication and association information for various network interfaces in a single profile; the ability to manage connections to various network interfaces using a common user interface, etc.).

Advantages that may be realized, alone or in combination, using various embodiments of the disclosed systems and methods include, but are not limited to, enhanced ease of use (EoU) provided by wireless device profiles, enhanced security provided through proximity based authentication, and easier network troubleshooting due to out-of-band device status management.

In one respect, disclosed herein is a method of managing in-band connection of information handling systems configured as wireless devices, the method including at least one of: using out-of-band wireless communication to manage in-band wireless connection of the wireless devices based at least in part on one or more wireless device profiles; or using out-of-band wireless communication to perform device configuration management; or using out-of-band wireless communication to perform device profile configuration management; or any combination thereof.

In another respect, disclosed herein is a method of managing in-band wireless connection of information handling systems configured as wireless devices, the method including using radio frequency identification (RFID) communication to authenticate at least one of the wireless devices for in-band wireless connection.

In another respect, disclosed herein is a wireless networking connection management system, including a first information handling system configured to use RFID communication to manage in-band wireless connection to one or more other information handling systems configured as secondary wireless devices.

DESCRIPTION OF ILLUSTRATIVE EMBODIMENTS

Figure 1:
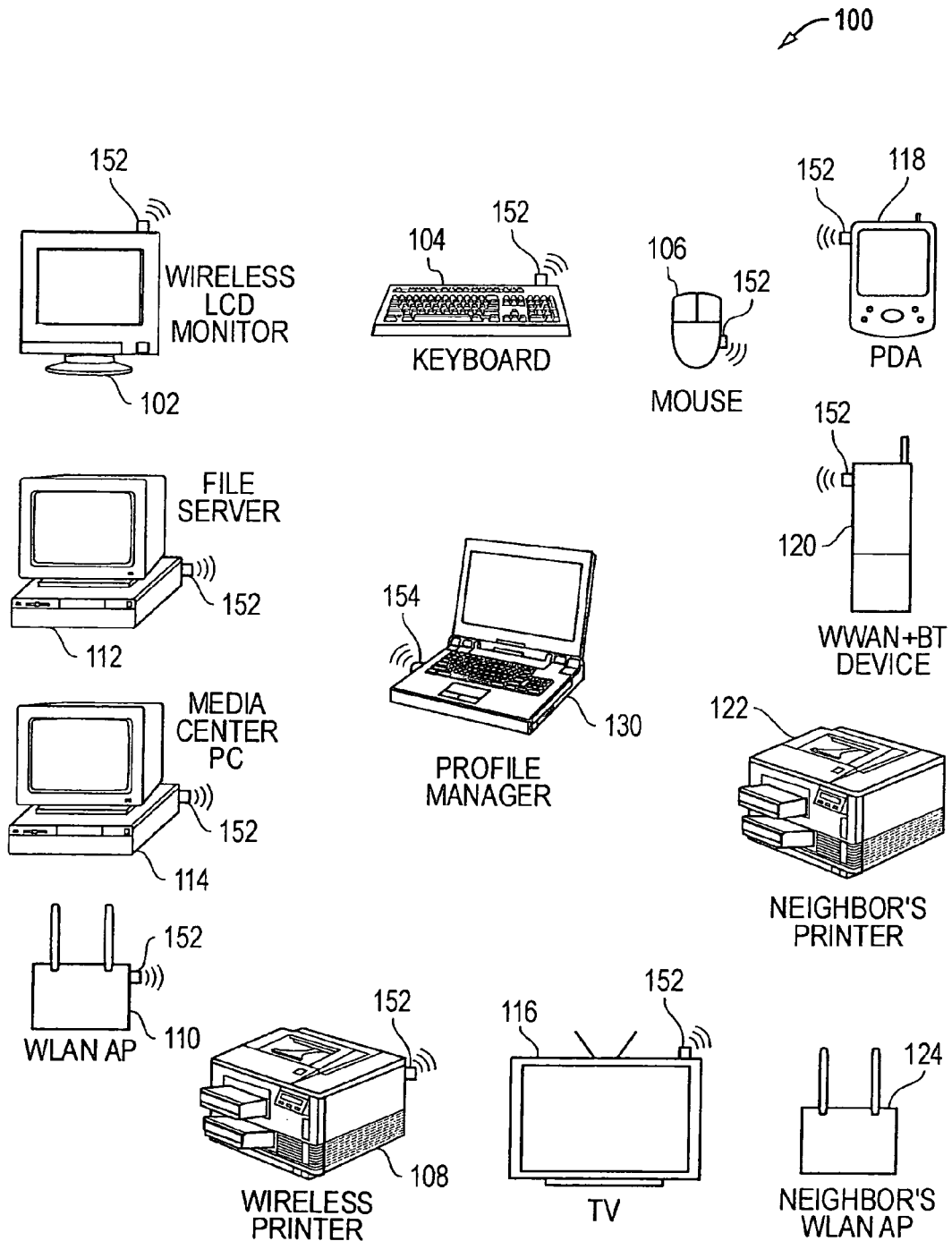
FIG. 1 is a simplified block diagram of a wireless networking environment according to one exemplary embodiment of the disclosed systems and methods.

FIG. 1 is a block diagram of a wireless networking environment 100 according to one exemplary embodiment of the disclosed systems and methods in which the disclosed systems and methods may be implemented to manage connection with information handling systems configured as secondary wireless devices (e.g., authenticate secondary wireless devices and make in-band connections to the same). As shown, wireless networking environment 100 includes a number of exemplary secondary wireless devices that may be encountered by a user of a wireless network that is operating an information handling system configured as a wireless profile manager 130. In this regard, the illustrated exemplary secondary wireless devices represent devices that may be encountered by a profile manager 130 within a particular physical location (e.g., home, office, etc.).

Figure 2:
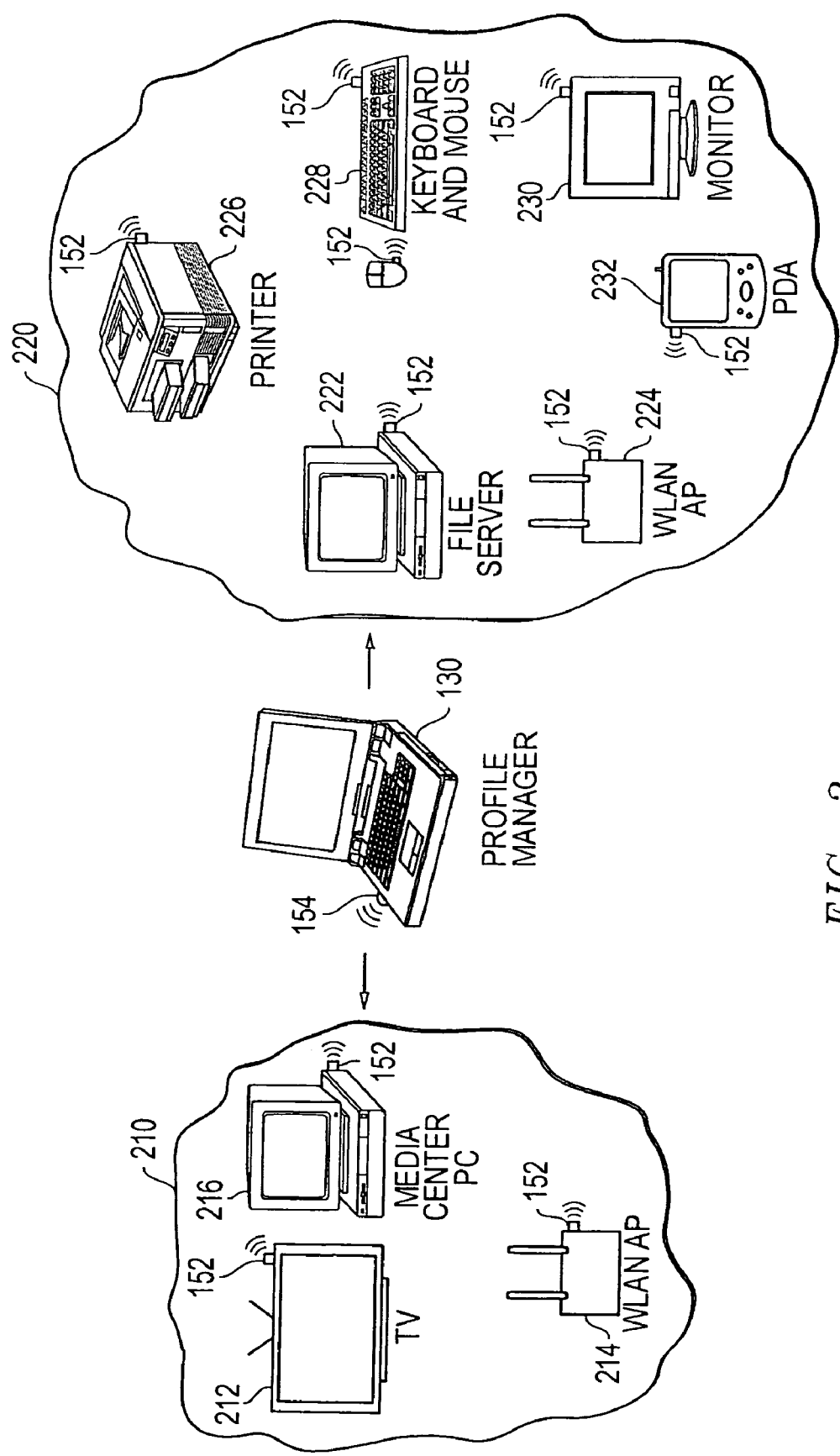
FIG. 2 is a simplified block diagram of a profile manager and two wireless networking environments according to one exemplary embodiment of the disclosed systems and methods.

The disclosed systems and methods may be implemented to manage connection with secondary wireless devices (e.g., authenticate secondary wireless devices and make in-band connections to the same) that may be encountered by profile manager 130 as it moves between networking environments at different physical locations (e.g., moves from office to home, home to office, etc.). In this regard, FIG. 2 shows a block diagram of one exemplary embodiment where profile manager 130 may move between a home networking environment 210 and an office networking environment 220. As illustrated, a set of secondary wireless devices exists in office networking environment 220 that is different from the set of secondary wireless devices existing in home networking environment 210.

In the embodiment of FIG. 1, wireless profile manager 130 is illustrated as a portable information handling system in the form of a notebook computer. Secondary wireless devices include wireless monitor 102, wireless keyboard 104, wireless mouse 106, wireless printer 108, wireless local area network access point 110, wireless file server 112, wireless media center personal computer 114, wireless television 116, wireless personal data assistant 118, wireless wide area network device 120, a neighbor's wireless printer 122, and a neighbor's wireless local area network access point 124. In one embodiment, such secondary wireless devices represent wireless devices that may be encountered in a single physical location, such as home.

In the practice of the disclosed systems and methods, a networking environment may be defined by in-band wireless (WLAN, WPAN, WWAN, WMAN) communication capability between profile manager/s and secondary wireless devices. In this regard, in-band wireless systems and device communication may be any wireless communication medium having frequency and protocol suitable for communicating network data (e.g., network computing data shared between WLAN network nodes) and/or control signals (e.g., data entry control signals from mouse, keyboard, etc.) between a given secondary wireless device and profile manager 130. Examples of such wireless media include, but are not limited to, wireless metropolitan are network (WMAN) media for applications such as Internet broadband access (e.g., WiMax 802.16d, WiMax 802.16e, WiMax 802.20), WWAN media for applications such as Internet broadband access (e.g., GSM/GPRS, EDGE, W-CDMA, HSDPA, cdma2000, 1xEV-DO), 1xEV-DV), WLAN media for applications such as mobile Ethernet and networking (e.g., 802.11a, 802.11b, 802.11g, 802.11n), WPAN media for applications such as peripheral cable replacement (e.g., Bluetooth 1.1, Bluetooth 1.2, Bluetooth EDR, Bluetooth 2.0, 802.15.3a UWB, 802.15.3a UWB-NG, 802.15.4), etc.

In the exemplary embodiment of FIG. 1, networking environment 100 is defined by in-band wireless systems and device communication capability between profile manager 103 and secondary wireless devices of FIG. 1. For example, wireless LCD monitor 102 may be capable of communicating with profile manager 130 via short range ultra wide band (UWB) communications. Keyboard 104, mouse 106 and PDA 118 may be capable of communicating with profile manager 130 via 2.4 GHz Bluetooth wireless protocol. WLAN access point 110, media center PC 114, file server 112, printer 108, television 116, neighbor's WLAN access point 124 and neighbor's printer 122 may be capable of communicating with profile manager 130 via 2.4 GHz 802.11a/b/g protocol. Wireless wide area network device 120 may be capable of communicating with profile manager 130 via cellular (e.g., GSM, CDMA) or 2.4 GHz Bluetooth protocol. In one exemplary embodiment, a profile manager 103 may be configured with integrated interfaces to 802.11a/b/g/n, Bluetooth and GSM/GPRS networks. In a further exemplary embodiment, a profile manage 103 may be further configured with integration of other network interfaces such as UWB and 802.11n, etc.

As shown, each of the secondary wireless devices illustrated in FIG. 1 is provided with a respective out-of-band wireless transmitter 152 capable of transmitting an out-of-band wireless signal, and profile manager 130 is provided with a corresponding out-of-band wireless receiver 154 that is configured to receive out-of-band wireless signals transmitted by each of out-of-band wireless transmitters 152. Out-of-band wireless transmitters 152 may be temporarily or permanently attached, physically coupled or otherwise associated in close proximity to a corresponding secondary wireless device, and in one embodiment may be integrated or embedded within a secondary wireless device. Similarly, an out-of-band wireless receiver 154 may be temporarily or permanently attached, physically coupled or otherwise associated with a corresponding profile manager, and in one embodiment may be integrated or embedded within a profile manager device. In this regard, out-of-band devices 152 may interface with the processing circuitry of corresponding secondary wireless devices and out-of-band devices 154 may interface with the processing circuitry of corresponding host profile managers through various serial or parallel data interfaces which may include, but are not limited to, USB, PCI, PCI Express etc. or any other proprietary signaling/handshaking/communication protocol. In one exemplary embodiment, an out-of-band device 154 may be configured to interface with the processing circuitry of a profile manager 130, while at the same time out-of-band devices 152 are not configured to interface with the processing circuitry of their corresponding secondary wireless devices.

In the practice of the disclosed systems and methods, an out-of-band signal may be any signal/s suitable for communicating information regarding one or more characteristics (e.g., unique identification (ID) information/identifier, system configuration, system capability, interrupt settings, firmware revision, manufacturer, status, ink level in printer, chipset, memory size, etc.) of secondary wireless devices to profile manager 130, and that is not in the same communication band as the in-band wireless systems and device communications transmitted between profile manager 130 and the secondary wireless devices.

Examples of suitable out-of-band signal types for use with current WMAN, WWAN, WLAN and WPAN in-band wireless communications include, but are not limited to, radio frequency identification (RFID) communications, IR based communications or any other short range communication protocol suited for reliable delivery of relatively small segments of data (less than 1 Kbytes), etc. In one embodiment, out-of-band signals may be selected for use that are of relatively short communication range relative to the in-band wireless operating distance between a wireless profile manager and a corresponding secondary wireless device, meaning that the operable communication distance of the out-of-band signal is shorter than the operable communication distance of the in-band wireless systems and device communications between the wireless profile manager and the secondary wireless device. For example, in one exemplary embodiment, the disclosed systems and methods may be implemented using an out-of-band signal having an operable communication range between secondary device transmitter and profile manager receiver that is less than or equal to about 10 feet. This is in comparison to a range of greater than or equal to about 100 feet for in-band wireless communication between a profile manager and a secondary device when using 802.11a.

In a further exemplary embodiment, use of a relatively short transmission range out-of-band signal may be implemented to allow proximity-based connection management (e.g., management of security and authentication procedures) between a profile manager and one or more secondary wireless devices, meaning that a new connection between a profile manager and a secondary wireless device is only allowed (e.g., authenticated) when the profile manager and the secondary wireless device are in a close proximity to each other dictated by the operating transmission range of the out-of-band signal. It is also possible that an out-of-band wireless transmitter may be configured with a variable out-of-band signal transmission range, e.g., to allow a user to customize the proximity required for connection management as needed or desired to fit requirements of a given networking environment/s.

Still referring to FIG. 1, out-of-band wireless transmitters 152 may be configured in one exemplary embodiment as RFID tags, and out-of-band wireless receiver 154 may be configured as a RFID reader that is configured to communicate with the RFID tags associated with the secondary wireless devices. In this regard, any combination of RFID tags and complementary RFID reader devices may be employed that is suitable for communicating information between secondary wireless devices and a profile manager to implement one or more of the connection management features described herein. Examples of suitable RFID tag devices include passive RFID tag devices (e.g., RFID devices that are powered by, or that reflect energy transmitted by, a corresponding RFID reader), and active RFID tag devices (e.g., RFID devices that are internally and continuously powered), it being understood that selection of type of RFID system may be made as needed or desired based on the characteristics of a particular networking environment application.

Examples of suitable RFID systems include, but are not limited to, RFID tags and complementary RFID readers based on the ISO 14443 standard (allowing data rates of 106 kbps). These RFID systems allow implementations having dynamic encryption capability and configurable memory architecture for added security and flexibility. Also suitable are RFID systems compatible with the ISO 15693 standard (allowing data rates of 26.46 kbps). In Europe, the RFID readers are regulated by the ETSI 302-208 standard. Specific examples of suitable RFID systems include, but are not limited to, RFID tags and complementary RFID readers available from Texas Instruments (TI), Applied Wireless Identification (AWID), SAMSys Technologies, Sokymat, ST Microelectronics, etc. Further information on RFID systems may be found, for example, in U.S. Pat. No. 6,294,997 and U.S. Pat. No. 6,724,309, each of which is incorporated herein by reference.

Examples of connection management capabilities that may be implemented when RFID devices that are employed as out-of-band wireless transmitter/s and complementary out-of-band RFID receiver/s in the embodiment of FIG. 1 include, but are not limited to, active and passive connection management configurations. In one exemplary embodiment of an active connection management configuration, a RFID reader device 154 associated with a profile manager 130 may be configured to interrogate a RFID tag 152 for specific information regarding one or more characteristics of the associated secondary wireless device (e.g., unique identification (ID) information/identifier, system configuration, system capability, interrupt settings, firmware revision, manufacturer, status, ink level in printer, chipset, memory size, etc.) stored on the particular RFID tag 152, to change and program the RFID tag 152 (e.g., RFID tag 152 on WLAN AP 110 may be reprogrammed using an AP configuration management utility to show new system configuration/capability, etc.), and/or to obtain active status and management information for the secondary wireless device (e.g., RFID tag 152 on WLAN AP 110 may contain, information about the number of associated client STAs, QoS service policies or the ability of the Wireless Access Point 152 to poll other RFID devices in the vicinity, etc.) associated with the RFID tag 152. In one exemplary embodiment of a passive connection management configuration, each RFID tag 152 associated with a secondary wireless device may be configured as a read-only tag that has information regarding one or more characteristics of the associated secondary wireless device programmed into the tag 152.

In either active or passive connection management embodiment, the RFID tags 152 may be 'actively' read or scanned by RFID reader 154 associated with profile manager 130 to obtain one or more characteristics of the associated secondary wireless device (e.g., device identification information, system configurations, etc.). As will be described further herein, a database management system may be implemented in one exemplary embodiment on profile manager 130 to use information obtained from RFID tags 152 (configured for active or passive connection management) by RFID reader 154 to authenticate and validate the required peripheral devices to a trusted network environment. In another embodiment, the RFID tag 152 on a given secondary wireless device may have additional functionality to act as an RFID reader and poll other RFID tags 152 and/or 154 in the vicinity of the given device. This capability may be implemented, for example, to allow a given secondary wireless device to maintain real-time information about other secondary wireless devices, and/or to feed this information back to a profile manager 130 using out-of-band communications.

In the implementation of the disclosed systems and methods, a given wireless device may be identified using any form of identification information that is suitable for identifying or otherwise distinguishing the given wireless device from other wireless devices using out-of-band communications. In one exemplary embodiment, MAC addresses may be used as unique device identification information (identifier or identification tag). Other examples of suitable identification information include, but are not limited to, bar codes, vendor specific IDs for products, IDs that conform to a certain industry standard, etc. As previously mentioned, other types of information concerning the characteristics of a given wireless device may also be transmitted via out-of-band communication, e.g. device configuration information, device capability information, etc.

Figure 3:
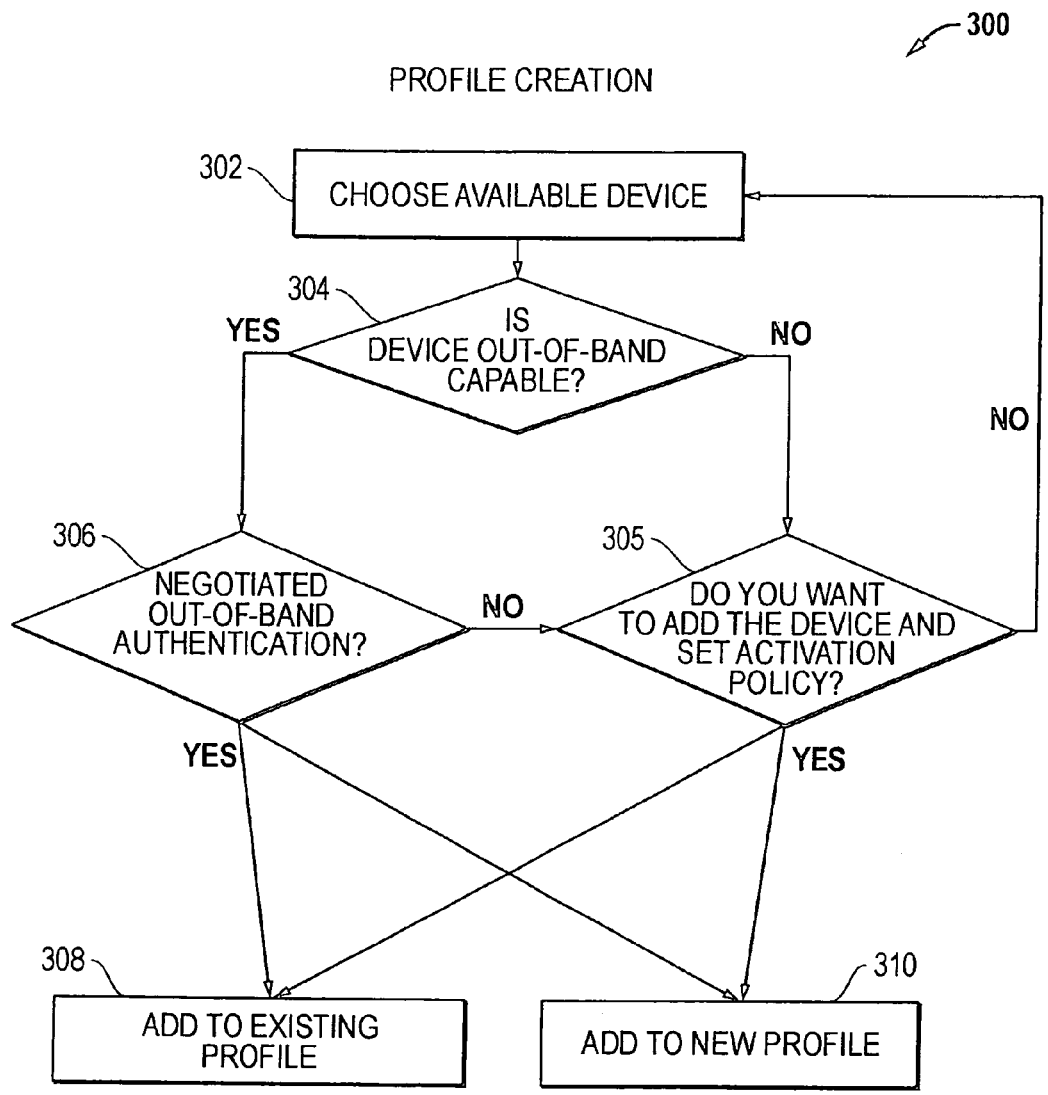
FIG. 3 illustrates profile creation methodology according to one exemplary embodiment of the disclosed systems and methods.

FIG. 3 illustrates profile creation methodology 300 that may be implemented according to one exemplary embodiment of the disclosed systems and methods, e.g. by profile manager 130 of FIGS. 1 and 2. In this regard, profile creation methodology may be implemented as software (e.g., executing on a notebook computer), as firmware (e.g., executing on a router) or in any other suitable manner for managing access to a given profile manager device.

Referring now to methodology 300 as it may be applied to the exemplary network environment embodiment of FIG. 1, one or more available secondary wireless devices are identified by profile manager 130 in step 302 using in-band wireless communications, and a given available secondary wireless device within network environment 100 is manually chosen (e.g., by mouse or keyboard input) or automatically chosen for authentication. In step 304, profile manager 103 polls the chosen available secondary wireless device using in-band wireless communication to determine if this secondary device is out-of-band capable. If the in-band response from the chosen secondary wireless device indicates that it is out-of-band capable, then methodology 300 proceeds to step 306, where out-of-band authentication is negotiated. In step 306, the chosen secondary wireless device communicates identification information (e.g., MAC address of the chosen secondary wireless device or other suitable identifier) to profile manager 130 using in-band communications. The chosen secondary wireless device and its associated identification information (and/or other information concerning one or more characteristics of the chosen secondary wireless device) may then be added as authentication information to an existing profile in step 308, or to a newly-created profile in step 310, e.g., as may be specified by user (e.g., manual or automatic policy).

However, if the in-band response (or lack thereof) from the chosen secondary wireless device indicates it is not out-of-band capable, then the profile creation methodology proceeds to step 305 where a user (e.g., manual or automatic policy) may be given the opportunity to choose whether or not the chosen secondary wireless device should be nonetheless added to a new or existing profile and an activation policy set for this added device. If the chosen secondary wireless device is not selected for addition, then methodology 300 returns to step 302 and waits for another secondary device to be chosen for authentication. However, if the chosen secondary wireless device is selected for addition, then the device is added to a new or existing profile as may be selected by a user (e.g., manual or automatic policy).

With regard to profile creation methodology 300 of FIG. 3 for a given profile manager device, it will be understood that one or more profiles may be created by choosing and negotiating any combination of secondary wireless devices for a given profile as may be needed or desired to fit the characteristics of one or more network environments to which the profile manager device may be exposed. Table 1 shows an entertainment wireless device profile that may be created by choosing available entertainment wireless devices present within network environment 100.

TABLE 1

Entertainment Profile

Chosen Secondary
Wireless Devices

WLAN Access Point 110
Media Center PC 114
TV 116 (Microsoft Media
Center Extender Device,
etc.)

Table 2 shows an office wireless device profile that may be created by choosing available home office wireless devices present within network environment 100.

TABLE 2

Office Profile

Chosen Secondary
Wireless Devices

WLAN Access Point 110
File Server 112
Wireless Printer 108
Keyboard/Mouse 104, 106
Monitor 102
PDA 118

Table 3 shows a mobility wireless device profile that may be created by choosing available mobile wireless devices present within network environment 100.

TABLE 3

Mobility Profile

Chosen Secondary
Wireless Devices

WWAN Device 120
PDA 118

Figure 4:
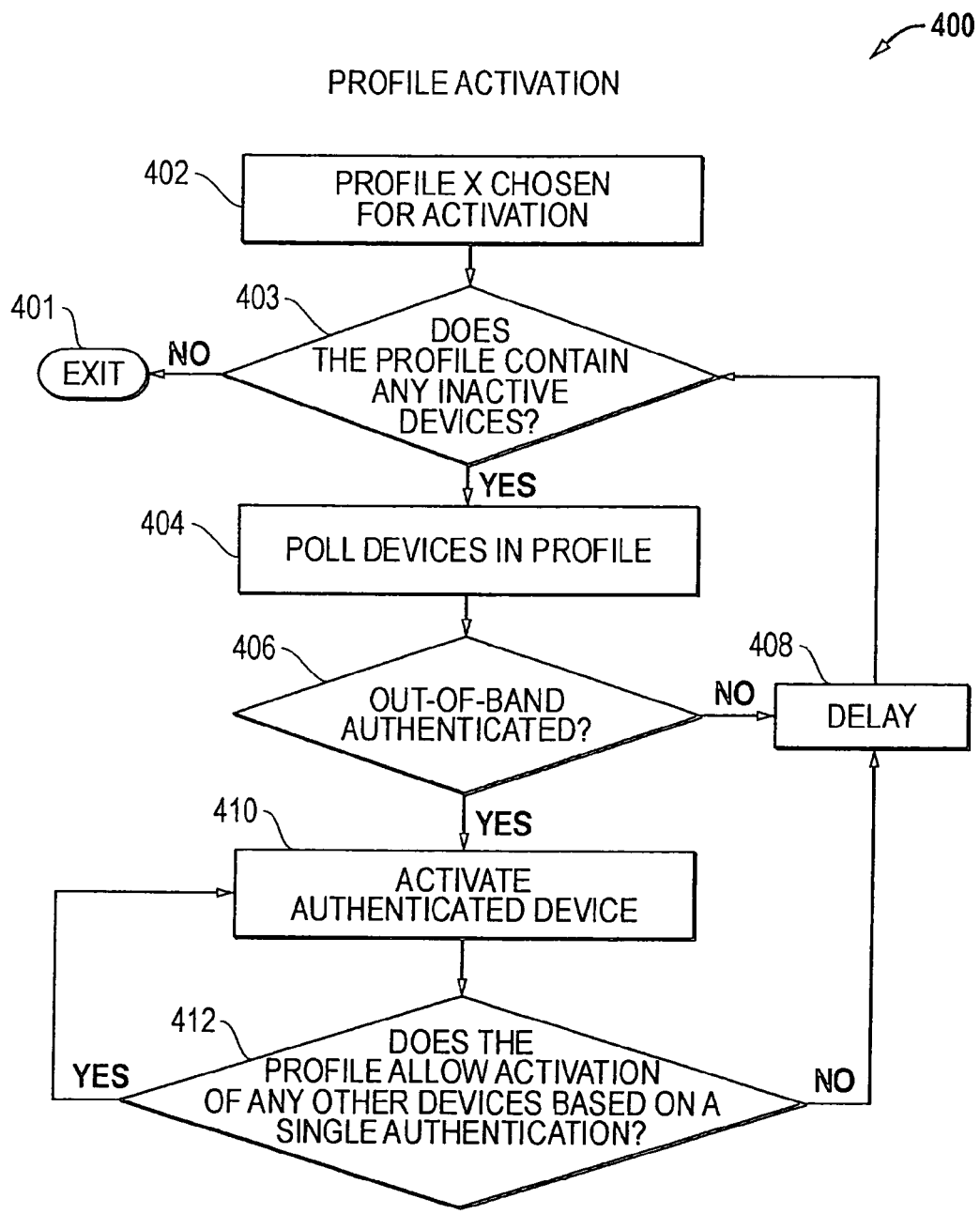
FIG. 4 illustrates profile activation methodology according to one exemplary embodiment of the disclosed systems and methods.

FIG. 4 illustrates profile activation methodology 400 that may be implemented according to one exemplary embodiment of the disclosed systems and methods, e.g. by profile manager 130 of FIGS. 1 and 2. Like profile creation methodology 300, profile activation methodology 400 may be implemented as software (e.g., executing on a notebook computer), as firmware (e.g., executing on a router) or in any other suitable manner for managing access to a given profile manager device.

Referring now to methodology 400 as it may be applied to the exemplary network environment embodiment of FIG. 1, a given profile (represented as "Profile X" in FIG. 4) stored in profile manager 130 may be manually chosen (e.g., by mouse or keyboard input) or automatically chosen in step 402 for activation. For example, Profile X may be one of the previously created profiles of Tables 1, 2 or 3 described above. If the chosen profile X does not include any inactive devices in step 403, then methodology 400 exits in step 401. However, if profile X includes one or more inactive devices, then methodology 400 proceeds to step 404, where secondary wireless devices of Profile X are then polled using out-of-band wireless communications (e.g., RFID polling transmission from RFID reader 154 of profile manager 130). In response to the polling transmission of step 404, each of those polled secondary wireless devices of Profile X that are within proximity of the out-of-band polling transmission then transmit authentication information to the profile manager 130 using out-of-band wireless communication (e.g., RFID transmission from RFID tag 152 associated the given polled secondary wireless device). As previously described, such authentication information may be information concerning one or more characteristics of the given polled secondary wireless device, and in one exemplary embodiment may be unique identification (ID) information/identifier such as MAC address of the given secondary wireless device.

When a given secondary wireless device within Profile X responds to the polling of step 404 with the correct out-of-band authentication information, it is authenticated by profile manager 130 in step 406. However, if a given secondary wireless device within Profile X responds incorrectly (or fails to respond correctly) to the polling of step 404, it is not authenticated in step 406. Upon failure to authenticate, a time delay (e.g., about 10 seconds or any other suitable delay time selected by a user) may be implemented in step 408 prior to repeating step 403 and, if necessary, re-polling the given secondary wireless device that failed to respond in step 404. Re-polling using step 404 may continue as necessary until all the secondary wireless devices of activated Profile X have correctly responded, until at least one of the secondary wireless devices of activated Profile X have correctly responded, and/or repolling attempts may be limited (e.g., limited to a specified number of poll attempts, limited by time limit for re-polling, etc.).

After one or more secondary wireless devices of Profile X are authenticated in step 406, a given secondary wireless device may be activated in step 410. Activation may be performed manually (e.g., by mouse or keyboard input) or may be performed automatically following successful authentication in step 406. Upon activation of a given secondary wireless device in step 410, in-band wireless communication is now allowed between profile manager 130 and the given secondary wireless device. As illustrated, Profile X may be configured in step 412 to allow activation of more than one secondary wireless device following authentication of secondary wireless devices in step 406, in which case step 410 may be repeated as necessary for multiple secondary wireless devices. Alternatively, Profile X may be configured in step 412 to not allow activation of additional secondary wireless devices following activation of a given secondary wireless device in step 410. In this case, methodology 400 may return to delay step 408, followed by repeating of step 403.

Without successful out-of-band authentication in step 406 and activation in step 410, no in-band wireless communication is allowed between a given secondary wireless device and profile manager 130. Thus, referring to the networking environment 100 of FIG. 1, no in-band wireless communication is permitted between profile manager 130 and neighbor's wireless printer 122 and neighbor's wireless access point 124, even if devices 122 and 124 are within in-band wireless communication range and are capable of communicating with profile manager 130 via in-band wireless communication. In this regard, in-band communication is only allowed between profile manager 130 and authenticated secondary wireless device/s of a chosen profile.

Even if devices 122 and 124 of FIG. 1 were capable of out-of-band communication, they could not be authenticated unless they were within out-of-band wireless communication proximity (e.g., close proximity), and capable of transmitting the correct authentication information via out out-of-band wireless communication to profile manager 130. By limiting out-of-band communication proximity in one exemplary embodiment to a distance that does not extend beyond the boundaries of a physical location of interest (e.g., room, house or office building), enhanced security from unauthorized access (e.g., from neighboring wireless devices outside the physical location of interest) may be advantageously provided by requiring both close proximity and transmittal of correct authentication information. Security may be further enhanced in one exemplary embodiment by configuring a profile manager with an out-of-band wireless receiver 154 (e.g., RFID reader) that is further capable of short range or close proximity out-of-band wireless transmission for purposes of writing security information (e.g., security code) to out-of-band wireless transmitter 152, and by requiring that this security information be transmitted back from wireless transmitter 152 to wireless receiver 154 via out-of-band wireless communications prior to successful authentication in step 406. However this embodiment may be flexibly configured to allow a user to program the profiles so that other devices in the profile are able to perform in-band communication even if out-of-band communication is not established.

Similarly, without successful out-of-band authentication in step 406 and activation in step 410, no in-band wireless communication is allowed between secondary wireless devices of other profiles that are not included in the currently selected Profile X. Thus, referring to the networking environment 100 of FIG. 1, no in-band wireless communication is permitted between profile manager 130 and secondary wireless devices 114, 116 and 120 when the Office Profile of Table 2 is selected, even if devices 114, 116 and 120 are within in-band wireless communication range and are capable of communicating with profile manager 130 via in-band wireless communication. By so managing profiles, it is possible to select those secondary wireless devices with which in-band communications are desired even when multiple secondary wireless devices of the same type are available within the same networking environment, e.g., closest wireless keyboard 104 and mouse 106.

It will be understood that the methodology of FIGS. 3 and 4 is exemplary only and that additional, fewer, and/or alternative steps may be employed to create and/or activate profiles in any manner suitable for accomplishing one or more of the features disclosed herein.

The wireless profile manager 130 illustrated in FIGS. 1 and 2 is illustrated as a portable information handling system in the form of a notebook computer. However, it will be understood that a wireless profile manager may be any other type of information handling system or device (e.g., personal computer, PDA, etc.) that is suitable for managing wireless connection profiles in a manner described elsewhere herein. Furthermore, it will be understood that although the disclosed systems and methods are described herein in relation to a single portable wireless profile manager operated by a human user, that other embodiments are possible. For example, more than one profile manager may be present and operating within a wireless networking environment at a single physical location, e.g., two or more different profile managers operated by the same or different users. In addition, it also possible that a profile manager may be operated by a non-human user, e.g., automated or robotic industrial equipment, automated or robotic office equipment, automated or robotic home equipment, automated or robotic laboratory equipment, etc. It is also possible that a profile manager may be a stationary (non-portable) device that encounters portable secondary wireless devices that move in or out of a networking environment, and/or portable or stationary devices that are only periodically activated within a networking environment.

It will also be understood that the portable and stationary (non-portable) secondary wireless devices illustrated in FIGS. 1 and 2 are exemplary only. In this regard, a secondary wireless device may be any other type of portable and/or stationary information handling system or wireless device (e.g., computer peripheral, etc.) that is suitable for interfacing with a profile manager in a manner as described elsewhere herein. Examples of such devices include, but are not limited to, industrial equipment, office equipment, laboratory equipment, video equipment including cameras, home equipment, etc. As described above, a secondary wireless device may be a portable device that moves in or out of a networking environment of a given portable or stationary profile manager, or may be stationary devices that are periodically placed within a networking environment of a given portable profile manager that moves in and out of proximity with the secondary wireless device, or may be stationary or portable devices that are periodically placed within a networking environment of a given portable profile manager due to periodic activation of the secondary wireless device and/or profile manager, etc. It is also possible that both a secondary wireless device and profile manager may be stationary devices, or that a secondary wireless device within a networking environment of a first profile manager may be itself a second profile manager, e.g., second profile manager having its own networking environment.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of managing in-band connection of an information handling system configured as a wireless profile manager with one or more secondary wireless devices operating in a given network environment, comprising:
   receiving a request in said wireless profile manager from a user to activate a chosen inactive wireless device profile on said wireless profile manager;
   determining if any of said secondary wireless devices of said chosen inactive wireless device profile are inactive in response to said request received by said wireless profile manager from said user to activate said chosen wireless device profile;
   polling any of said secondary wireless devices of said chosen inactive wireless device profile that are determined to be inactive, said polling being performed by said wireless profile manager using out-of-band wireless communication;
   receiving an out-of-band wireless communication response transmitted from one or more of said determined inactive secondary wireless devices to said wireless profile manager in response to said polling, said out-of-band wireless communication response comprising authentication information;
   authenticating any of said one or more determined inactive secondary wireless devices that transmit correct authentication information to said wireless profile manager in response to said polling, and not authenticating any of said one or more of said determined inactive secondary wireless devices that do not transmit correct authentication information to said wireless profile manager in response to said polling; and
   activating any of said one or more determined inactive secondary wireless devices that have been authenticated for in-band wireless communication with said wireless profile manager, and not activating any of said one or more determined inactive secondary wireless devices that have not been authenticated for in-band wireless communication with said wireless profile manager.

2. The method of claim 1, wherein said out-of-band wireless communication comprises radio frequency identification (RFID) communication; and wherein said wireless profile manager is a portable information handling system in the form of a notebook computer.

3. The method of claim 1, wherein said chosen inactive wireless device profile contains the identity of one or more secondary wireless devices selected to fit one or more characteristics of said given network environment; and wherein said one or more characteristics of said given network environment comprise a physical location of said given network environment.

4. The method of claim 1, wherein said chosen inactive wireless device profile contains the identity of one or more secondary wireless devices selected to fit one or more characteristics of said given network environment; and wherein said one or more characteristics of said given network environment comprise a selected usage of said given network environment.

5. The method of claim 1, wherein said wireless profile manager is provided with multiple wireless device profiles, a first one of said multiple wireless device profiles including a group of multiple secondary wireless devices that is selected to fit one or more first characteristics of said given network environment and a second one of said multiple wireless device profiles including a group of multiple secondary wireless devices that is that is selected to fit one or more second characteristics of said given network environment that is different from said one or more first characteristics of said network environment; wherein said group of multiple secondary wireless devices included in said second one of said multiple wireless device profiles is different from said group of multiple secondary wireless devices included in said first one of said multiple wireless device profiles; and wherein said chosen inactive wireless device profile is one of said first or second one of said multiple wireless device profiles that is chosen by said user for activation.

6. The method of claim 1, wherein said chosen inactive wireless device profile includes the identities of a group of multiple secondary wireless devices that fit one or more characteristics of said given network environment; and wherein said method further comprises activating more than one of said multiple secondary wireless devices of said chosen inactive wireless device profile at the same time.

7. The method of claim 1, further comprising using a first one of said secondary wireless devices to poll one or more other of said secondary wireless devices using out-of-band wireless communication; receiving an out-of-band wireless communication response transmitted from one or more of said other secondary wireless devices to said first one of said secondary wireless devices in response to said polling, said out-of-band wireless communication response comprising information about said one or more other secondary wireless devices; and transmitting information about said one or more other secondary wireless devices from said first one of said secondary wireless devices to said wireless profile manager using out-of-band wireless communication.

8. The method of claim 1, further comprising providing authentication for in-band wireless connection of said determined inactive secondary wireless devices based on proximity of said determined inactive secondary wireless devices; and wherein said out-of-band wireless communication has a communication range that is shorter than a communication range of said in-band wireless communication.

9. The method of claim 1, wherein said authentication information comprises information identifying said one or more determined inactive secondary wireless devices; and wherein said method further comprises matching said authentication information to corresponding authentication information contained in said at least one wireless device profile on said wireless profile manager to authenticate said one or more determined inactive secondary wireless devices.

10. A method of using out-of-band wireless communication to perform device profile configuration management for wireless devices operating in a given network environment, comprising:
   providing an information handling system configured as a wireless profile manager configured to communicate with secondary wireless devices using in-band wireless communication and out-of-band wireless communication, said wireless profile manager configured to include at least one wireless device profile that includes the identities of a group of said secondary wireless devices;
   using in-band wireless communication from said wireless profile manager to identify one or more available secondary wireless devices that are not currently in at least one wireless device profile of said wireless profile manager,
   polling said one or more identified available secondary wireless devices a first time to determine if one or more of said identified available secondary wireless devices is capable of out-of-band wireless communication, said first time polling being performed by said wireless profile manager using in-band wireless communication;

receiving a first in-band wireless communication response transmitted from one or more of said identified available secondary wireless devices to said wireless profile manager in response to said first time in-band wireless communication polling, said in-band wireless communication response indicating that said one or more of said responding identified available secondary wireless devices is capable of out-of-band wireless communication;

negotiating out-of-band wireless authentication between said wireless profile manager and said one or more identified available secondary wireless devices that has responded that it is capable of out-of-band wireless communication, said negotiating comprising:

receiving a second in-band wireless communication response in said wireless profile manager from at least one of said one or more identified available secondary wireless devices that is capable of out-of-band wireless communication, said second in-band wireless communication response comprising authentication information for said at least one of said one or more identified available secondary wireless devices that is capable of out-of-band wireless communication, and adding said received authentication identification information for said at least one of said one or more identified available secondary wireless devices to at least one wireless device profile of said wireless profile manager.

11. The method of claim 10, wherein prior to said first time polling said wireless profile manager has at least one existing wireless device profile that includes the identities of an existing group of said secondary wireless devices; and wherein said method further comprises:

using in-band wireless communication from said wireless profile manager to identify one or more additional available secondary wireless devices that are not currently in said at least one existing wireless device profile;

polling said one or more identified additional available secondary wireless devices a first time to determine if one or more of said identified additional available secondary wireless devices is capable of out-of-band wireless communication, said first time polling being performed by said wireless profile manager using in-band wireless communication;

receiving a first in-band wireless communication response transmitted from one or more of said identified additional available secondary wireless devices to said wireless profile manager in response to said first time in-band wireless communication polling, said in-band wireless communication response indicating that said one or more of said responding identified additional available secondary wireless devices is capable of out-of-band wireless communication;

negotiating out-of-band wireless authentication between said wireless profile manager and said one or more identified additional available secondary wireless devices that has responded that it is capable of out-of-band wireless communication, said negotiating comprising:

receiving a second in-band wireless communication response in said wireless profile manager from at least one of said one or more identified additional available secondary wireless devices that is capable of out-of-band wireless communication, said second in-band wireless communication response comprising authentication information for said at least one of said one or more identified additional available secondary wireless devices that is capable of out-of-band wireless communication, and adding said received authentication identification information for said at least one of said one or more identified additional available secondary wireless devices to said existing group of said secondary wireless devices of said at least one existing wireless device profile of said wireless profile manager.

12. The method of claim 10, wherein said out-of-band wireless communication comprises radio frequency identification (RFID) communication; and wherein said wireless profile manager is a portable information handling system in the form of a notebook computer.

13. The method of claim 11, wherein said at least one existing wireless device profile contains the identity of one or more secondary wireless devices selected to fit one or more characteristics of said given network environment; wherein said identified one or more additional available secondary wireless devices are selected to fit the same characteristics of said given network environment as said other secondary wireless devices of said at least one existing wireless device profile; and wherein said one or more characteristics of said given network environment comprise a physical location of said given network environment.

14. The method of claim 11, wherein said chosen inactive wireless device profile contains the identity of one or more secondary wireless devices selected to fit one or more characteristics of said given network environment; wherein said identified one or more additional available secondary wireless devices are selected to fit the same characteristics of said given network environment as said other secondary wireless devices of said at least one existing wireless device profile; and wherein said one or more characteristics of said given network environment comprise a selected usage of said given network environment.

15. The method of claim 11, wherein said wireless profile manager is provided with multiple existing wireless device profiles, a first one of said multiple existing wireless device profiles including a group of multiple secondary wireless devices that is selected to fit one or more first characteristics of said given network environment and a second one of said multiple existing wireless device profiles including a group of multiple secondary wireless devices that is that is selected to fit one or more second characteristics of said given network environment that is different from said one or more first characteristics of said network environment; wherein said group of multiple secondary wireless devices included in said second one of said multiple existing wireless device profiles is different from said group of multiple secondary wireless devices included in said first one of said multiple existing wireless device profiles; and wherein said identified one or more additional available secondary wireless devices are selected to fit the same characteristics of said first one of said multiple existing wireless device profiles as said other secondary wireless devices of said first one of said multiple existing wireless device profiles.

16. A wireless profile manager, comprising an information handling system configured to communicate with one or more secondary wireless devices operating in a given network environment, said information handling system configured to communicate with each of said one or more secondary wireless devices using in-band wireless communication and out-of-band wireless communication; and wherein said wireless profile manager is further configured to:

receive a request from a user to activate a chosen inactive wireless device profile on said wireless profile manager;

determine if any of said secondary wireless devices of said chosen inactive wireless device profile are inactive in response to said request received by said wireless profile manager from said user to activate said chosen wireless device profile;

poll any of said secondary wireless devices of said chosen inactive wireless device profile that are determined to be inactive, said polling being performed by said wireless profile manager using out-of-band wireless communication;

receive an out-of-band wireless communication response transmitted from one or more of said determined inactive secondary wireless devices to said wireless profile manager in response to said polling, said out-of-band wireless communication response comprising authentication information;

authenticate any of said one or more determined inactive secondary wireless devices that transmit correct authentication information to said wireless profile manager in response to said polling, and not authenticate any of said one or more of said determined inactive secondary wireless devices that do not transmit correct authentication information to said wireless profile manager in response to said polling; and activate any of said one or more determined inactive secondary wireless devices that have been authenticated for in-band wireless communication with said wireless profile manager, and not activate any of said one or more determined inactive secondary wireless devices that have not been authenticated for in-band wireless communication with said wireless profile manager.

17. The wireless profile manager of claim 16, wherein said out-of-band wireless communication comprises radio frequency identification (RFID) communication, and wherein said wireless profile manager is a portable information handling system in the form of a notebook computer.

18. The wireless profile manager of claim 16, wherein said wireless profile manager is further configured to provide authentication for in-band wireless connection of said determined inactive secondary wireless devices based on proximity of said determined inactive secondary wireless devices; and wherein said out-of-band wireless communication has a communication range that is shorter than a communication range of said in-band wireless communication.

19. The wireless profile manager of claim 16, wherein said authentication information comprises information identifying said one or more determined inactive secondary wireless devices; and wherein said wireless profile manager is further configured to match said authentication information to corresponding authentication information contained in said at least one wireless device profile on said wireless profile manager to authenticate said one or more determined inactive secondary wireless devices.

20. A wireless profile manager, comprising an information handling system configured to communicate with one or more secondary wireless devices operating in a given network environment, said information handling system configured to communicate with each of said one or more secondary wireless devices using in-band wireless communication and out-of-band wireless communication; and wherein said wireless profile manager is further configured to:

include at least one wireless device profile that includes the identities of a group of said secondary wireless devices;

use in-band wireless communication from said wireless profile manager to identify one or more available secondary wireless devices that are not currently in at least one wireless device profile of said wireless profile manager;

poll said one or more identified available secondary wireless devices a first time to determine if one or more of said identified available secondary wireless devices is capable of out-of-band wireless communication, said first time polling being performed by said wireless profile manager using in-band wireless communication;

receive a first in-band wireless communication response transmitted from one or more of said identified available secondary wireless devices to said wireless profile manager in response to said first time in-band wireless communication polling, said in-band wireless communication response indicating that said one or more of said responding identified available secondary wireless devices is capable of out-of-band wireless communication;

negotiate out-of-band wireless authentication between said wireless profile manager and said one or more identified available secondary wireless devices that has responded that it is capable of out-of-band wireless communication, said negotiating comprising:

receiving a second in-band wireless communication response in said wireless profile manager from at least one of said one or more identified available secondary wireless devices that is capable of out-of-band wireless communication, said second in-band wireless communication response comprising authentication information for said at least one of said one or more identified available secondary wireless devices that is capable of out-of-band wireless communication, and adding said received authentication identification information for said at least one of said one or more identified available secondary wireless devices to at least one wireless device profile of said wireless profile manager.

* * * * *